(12) United States Patent
Nagata

(10) Patent No.: US 9,570,765 B2
(45) Date of Patent: Feb. 14, 2017

(54) FUEL SUPPLY UNIT

(71) Applicant: AISAN KOGYO KABUSHIKI KAISHA, Obu-shi, Aichi (JP)

(72) Inventor: Sadatsugu Nagata, Aichi-gun (JP)

(73) Assignee: AISAN KOGYO KABUSHIKI KAISHA, Obu-shi (JP)

( * ) Notice: Subject to any disclaimer, the term of this patent is extended or adjusted under 35 U.S.C. 154(b) by 0 days.

(21) Appl. No.: 14/878,486

(22) Filed: Oct. 8, 2015

(65) Prior Publication Data

US 2016/0133961 A1    May 12, 2016

(30) Foreign Application Priority Data

Nov. 7, 2014    (JP) .................................. 2014-227082

(51) Int. Cl.
F16K 17/18    (2006.01)
F16K 27/00    (2006.01)
H01M 8/04    (2016.01)

(52) U.S. Cl.
CPC .......... *H01M 8/04089* (2013.01); *F16K 27/00* (2013.01); *H01M 8/04201* (2013.01); *Y10T 137/7771* (2015.04)

(58) Field of Classification Search
CPC .................... Y10T 137/7771; Y10T 137/7777; Y10T 137/7779; Y10T 137/87885; Y10T 137/87314; F16K 27/00; F16K 27/0263
See application file for complete search history.

(56) References Cited

U.S. PATENT DOCUMENTS

| | | | | |
|---|---|---|---|---|
| 3,441,050 A | * | 4/1969 | Sanchez | F16K 17/196 137/493.6 |
| 4,179,888 A | * | 12/1979 | Goscenski, Jr. | B60K 11/00 123/41.12 |
| 5,150,690 A | * | 9/1992 | Carter | F02B 43/00 123/478 |
| 6,216,739 B1 | | 4/2001 | Fukushima et al. | |
| 6,845,614 B2 | * | 1/2005 | Stahlman | F01P 7/044 137/884 |
| 6,910,502 B2 | * | 6/2005 | Landhuis | F16H 61/4017 137/493.4 |
| 7,905,251 B2 | * | 3/2011 | Flanders | E21B 33/03 137/599.01 |

(Continued)

FOREIGN PATENT DOCUMENTS

| | | |
|---|---|---|
| JP | 2000-314500 A | 11/2000 |
| JP | 2008-041265 A | 2/2008 |
| JP | 2012-156033 A | 8/2012 |

*Primary Examiner* — John Fox
*Assistant Examiner* — Seth W Mackay-Smith
(74) *Attorney, Agent, or Firm* — Oliff PLC

(57) ABSTRACT

A hydrogen supply unit is configured to inject hydrogen gas having flowed in an inflow passage into an outflow passage by use of an injector to reduce the pressure of the hydrogen gas. The hydrogen supply unit includes a primary-side relief valve for releasing the hydrogen gas from inside to outside of the inflow passage when the internal pressure of the inflow passage rises to a first predetermined value, and a secondary-side relief valve for releasing the hydrogen gas from inside to outside of the outflow passage when the internal pressure of the outflow passage rises to a second predetermined value. The primary-side relief valve and the secondary-side relief valve are held between the inflow block and the outflow block.

7 Claims, 8 Drawing Sheets

(56) References Cited

U.S. PATENT DOCUMENTS 8,327,871 B1* 12/2012 Franklin ............ G05D 16/0605
137/271
2010/0233563 A1* 9/2010 Katano ............ H01M 8/04089
429/446

* cited by examiner

FUEL SUPPLY UNIT

CROSS-REFERENCE TO RELATED APPLICATIONS

This application is based upon and claims the benefit of priority from the prior Japanese Patent Application No. 2014-227082, filed Nov. 7, 2014, the entire contents of which are incorporated herein by reference.

BACKGROUND OF THE INVENTION

Field of the Invention

The present invention relates to a fuel supply unit to be used for adjusting the flow rate and pressure of fuel gas which will be supplied from a fuel container to a supply destination.

Related Art

Heretofore there is known a fuel cell system disclosed for example in Patent Document 1 listed below. The fuel cell system disclosed in Patent Document 1 includes an inlet-side manifold to which the fuel gas will be supplied, injectors provided in the inlet-side manifold and used for controlling the flow rate and pressure of the fuel gas, and an outlet-side manifold provided on an injection side of the injectors. Further, a relief valve is provided in the outlet-side manifold.

RELATED ART DOCUMENTS

Patent Documents

Patent Document 1: JP-A-2012-156033

SUMMARY OF INVENTION

Problems to be Solved by the Invention

The fuel cell system disclosed in Patent Document 1 can realize unitization of a fuel gas supply pipe system into one unit. However, this Document 1 does not particularly disclose a method for placing the relief valve. If the relief valve is provided in the outlet-side manifold, generally, it is conceivable that some components such as a plug and a bolt are necessary to secure the relief valve to the outlet-side manifold. This would result in a troublesome work to install the relief valve in the outlet-side manifold. It is thus desired to reduce the number of components constituting the unit. If the relief valve is provided in a position protruding outward from the outlet-side manifold, such a relief valve will disturb downsizing of the unit. In this case, such a unit could not be installed with enough room in a limited space of an engine room of a vehicle. Therefore the unit is desired to be further reduced in size.

The present invention has been made to solve the above problems and has a purpose to provide a fuel supply unit capable of reducing the number of components and the size of the unit.

Means of Solving the Problems

To achieve the foregoing purpose, one aspect of the invention provides a fuel supply unit comprising: an inflow block provided with an inflow passage in which fuel gas will flow; an outflow block provided with an outflow passage from which the fuel gas will flow out; and at least one injector for adjusting flow rate and pressure of the fuel gas, the injector being configured to inject the fuel gas having flowed in the inflow passage into the outflow passage to reduce pressure of the fuel gas, wherein the fuel supply unit further comprises a relief valve configured to release the fuel gas from inside to outside of either the inflow passage or the outflow passage when internal pressure of the corresponding passage rises a predetermined value or more, and the relief valve is held between the inflow block and the outflow block.

According to the above aspect, it is possible to eliminate the need for a fastening member for fixing a relief valve to an inflow block or an outflow block, thereby enabling reduction in the number of components of the fuel supply unit. Further, the relief valve can be assembled together with the inflow block and the outflow block without protruding from the inflow block and the outflow block, so that downsizing of the fuel supply unit can be achieved.

Effects of the Invention

According to the fuel supply unit of the present invention, it is possible to reduce the number of components and downsize the unit.

DESCRIPTION OF EMBODIMENTS

Explanation of Fuel Cell System

Figure 1:
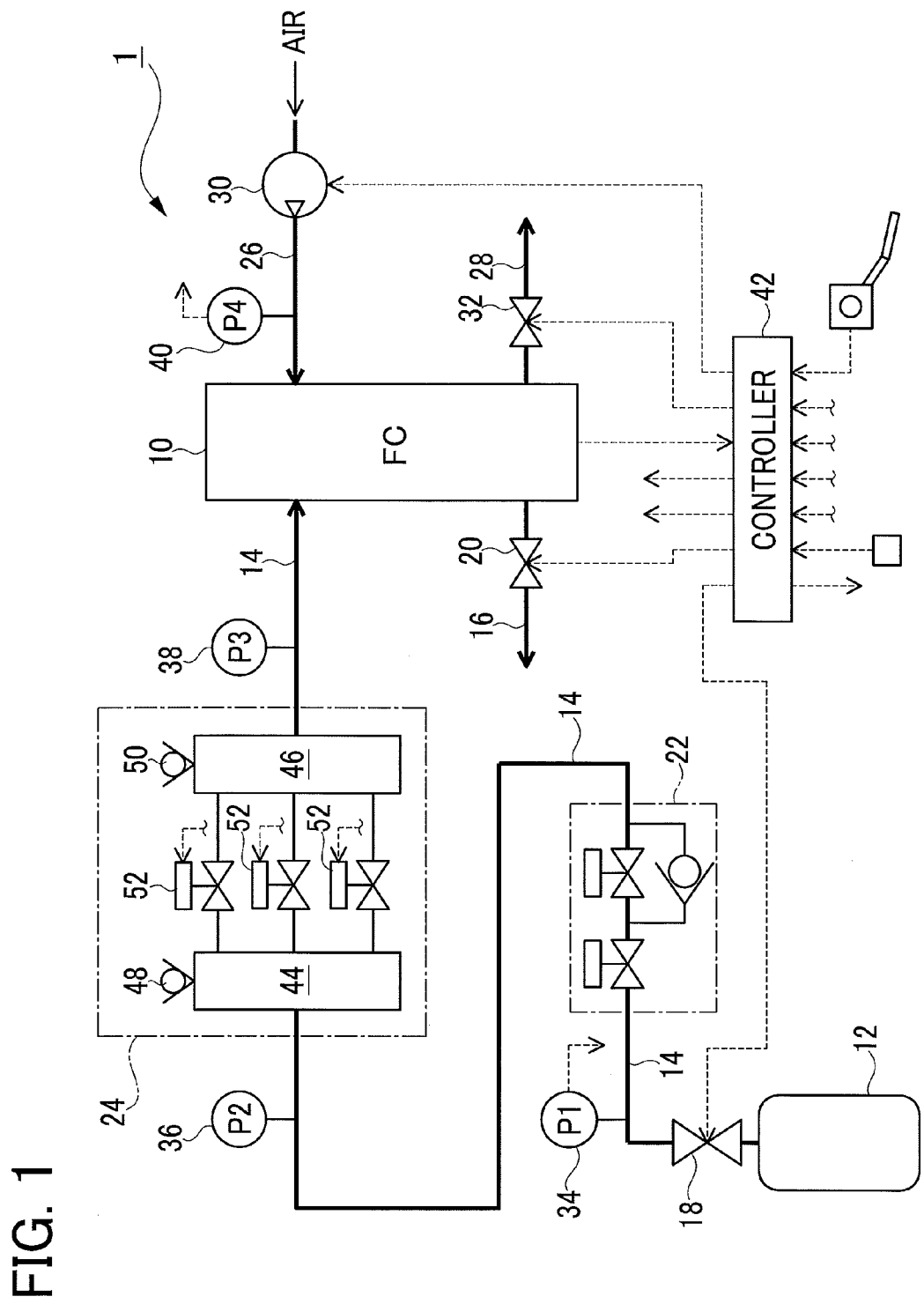
FIG. 1 is a schematic configuration view of a fuel cell system.

A detailed description of a preferred embodiment of the present invention will now be given referring to the accompanying drawings. Firstly, a fuel cell system 1 will be explained. This fuel cell system 1 includes a fuel cell 10, a hydrogen cylinder 12, a hydrogen supply passage 14, a hydrogen discharge passage 16, a main stop valve 18, a first changeover valve 20, a high-pressure regulator 22, a hydrogen supply unit 24, an air supply passage 26, an air discharge passage 28, an air pump 30, a second changeover valve 32, a primary pressure sensor 34, a secondary pressure sensor 36, a third-order pressure sensor 38, an air pressure sensor 40, a controller 42, and others.

This fuel cell system 1 will be mounted in an electric vehicle and used to supply electric power to a drive motor (not shown) for the vehicle. In use, the fuel cell 10 generates electricity upon receipt of hydrogen gas as fuel gas and air as oxidant gas. The electricity generated in the fuel cell 10 is supplied to the drive motor (not shown) through an inverter (not shown). The hydrogen cylinder 12 stores high-pressure hydrogen gas.

On an anode side of the fuel cell 10, a hydrogen supply system is provided. This system 1 includes a hydrogen supply passage 14 for supplying hydrogen gas from the hydrogen cylinder 12 to a supply destination, i.e., the fuel cell 10, and a hydrogen discharge passage 16 for discharging a hydrogen off-gas allowed to flow out of the fuel cell 10. In the hydrogen supply passage 14 immediately downstream of the hydrogen cylinder 12, the main stop valve 18 is placed, which consists of an electromagnetic valve configured to switch between supplying and shutoff of hydrogen gas from the hydrogen cylinder 12 to the hydrogen supply passage 14. In the hydrogen discharge passage 16, the first changeover valve 20 consisting of an electromagnetic valve is provided.

In the hydrogen supply passage 14 downstream of the main stop valve 18, the high-pressure regulator 22 is provided to reduce the pressure of hydrogen gas. In the hydrogen supply passage 14 between the main stop valve 18 and the high-pressure regulator 22, the primary pressure sensor 34 is provided to detect the internal pressure of the passage 14 as primary pressure P1.

In the hydrogen supply passage 14 downstream of the high-pressure regulator 22, the secondary pressure sensor 36 is provided. This secondary pressure sensor 36 detects the internal pressure of the hydrogen supply passage 14 between the high-pressure regulator 22 and the hydrogen supply unit 24 as secondary pressure P2.

In the hydrogen supply passage 14 downstream of the secondary pressure sensor 36, the hydrogen supply unit 24 is provided to adjust the flow rate and pressure of hydrogen gas to be supplied to the fuel cell 10. The hydrogen supply unit 24 is one example of a fuel supply unit of the present invention. The details of the hydrogen supply unit 24 will be explained later.

In the hydrogen supply passage 14 downstream of the hydrogen supply unit 24, the third-order pressure sensor 38 is provided. This third-order pressure sensor 38 detects the internal pressure of the passage 14 between the hydrogen supply unit 24 and the fuel cell 10 as third-order pressure P3.

On the other hand, on a cathode side of the fuel cell 10, there are provided the air supply passage 26 for supplying air to the fuel cell 10 and the air discharge passage 28 for discharging air off-gas allowed to flow out of the fuel cell 10. In the air supply passage 26, the air pump 30 is provided to adjust air flow rate to be supplied to the fuel cell 10. In the air supply passage 26 downstream of the air pump 30, the air pressure sensor 40 is provided to detect air pressure P4. In the air discharge passage 28, the second changeover valve 32 consisting of an electromagnetic valve is provided.

In the foregoing structure, the hydrogen gas delivered from the hydrogen cylinder 12 is supplied to the fuel cell 10 by passing through the hydrogen supply passage 14 via the main stop valve 18, the high-pressure regulator 22, and the hydrogen supply unit 24. The hydrogen gas supplied to the fuel cell 10 is used for power generation in the fuel cell 10 and thereafter is discharged as hydrogen off-gas from the fuel cell 10 via the hydrogen discharge passage 16 and the first changeover valve 20.

In the aforesaid structure, the air injected by the air pump 30 into the air supply passage 26 is supplied to the fuel cell 10. This air supplied to the fuel cell 10 is used for power generation in the fuel cell 10 and thereafter is discharged as air off-gas from the fuel cell 10 via the air discharge passage 28 and the second changeover valve 32.

This fuel cell system 1 further includes a controller 42 responsible for controlling the system 1. Specifically, in order to control a flow of hydrogen gas to be supplied to the fuel cell 10, the controller 42 controls the main stop valve 18 and injectors 52 provided in the hydrogen supply unit 24 based on detection values of the primary pressure sensor 34, the secondary pressure sensor 36, and the third-order pressure sensor 38. The controller 42 further controls the first changeover valve 20 to control a flow of hydrogen off-gas in the hydrogen discharge passage 16. On the other hand, the controller 42 controls the air pump 30 based on a detection value of the air pressure sensor 40 to control a flow of air to be supplied to the fuel cell 10.

Further, the controller 42 controls the second changeover valve 32 to control a flow of air off-gas in the air discharge passage 28. The controller 42 receives a voltage value and a current value resulting from generation of electricity in the fuel cell 10. The controller 42 includes a central processing unit (CPU) and a memory and thus controls each of the injectors 52, the air pump 30, and others based on a predetermined control program stored in the memory to control the flow rate of hydrogen gas and the flow rate of air to be supplied to the fuel cell 10.

(Explanation of Hydrogen Supply Unit)

Next, the hydrogen supply unit 24 will be explained below.

Example 1

Figure 2:
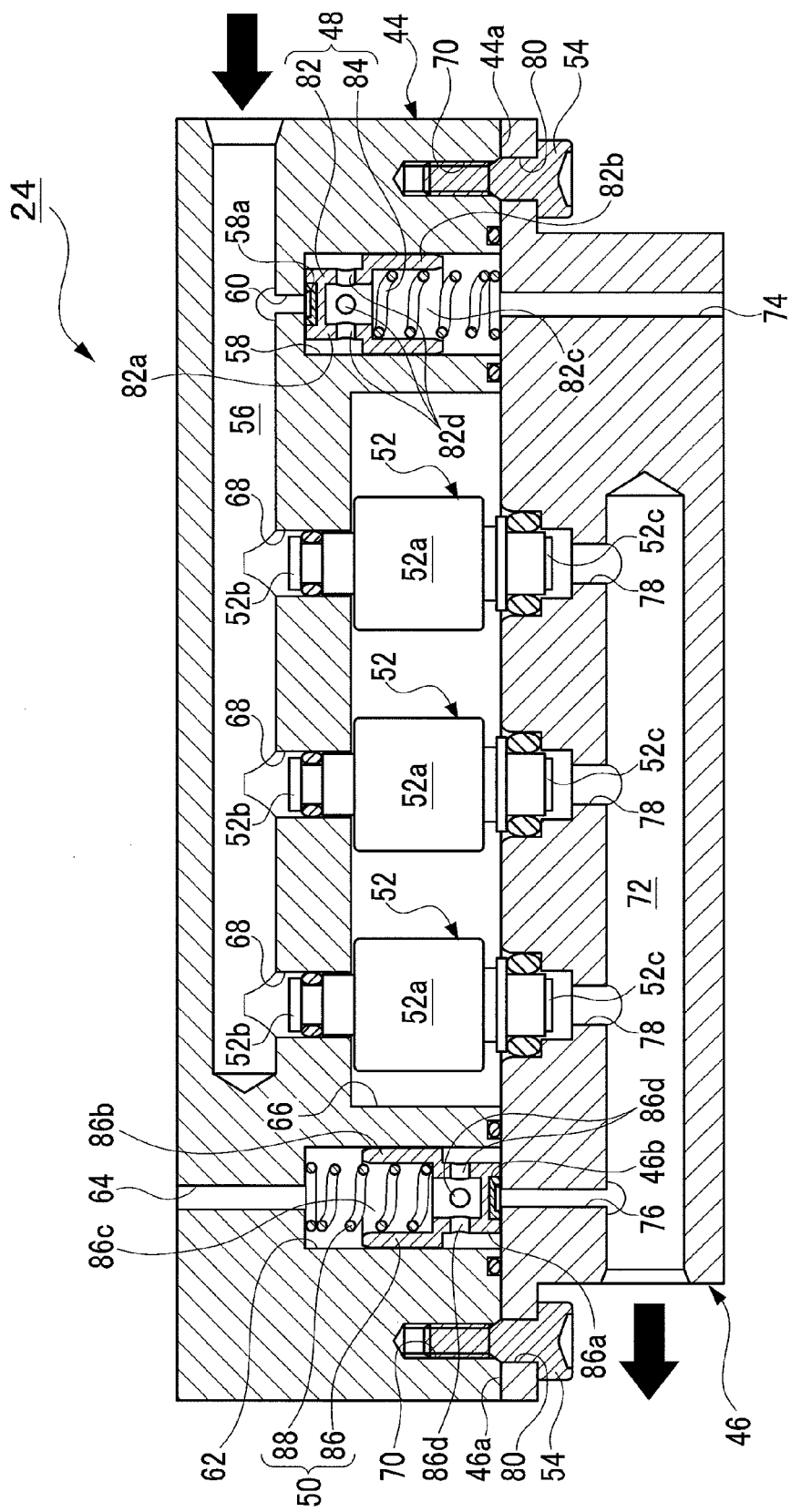
FIG. 2 is a cross sectional view of a hydrogen supply unit in Example 1.

In Example 1, the hydrogen supply unit 24 includes, as shown in FIGS. 1 and 2, an inflow block 44, an outflow block 46, a primary-side relief valve 48, a secondary-side relief valve 50, the injectors 52, bolts 54, and others. The primary-side relief valve 48 is one example of a "first relief valve" of the present invention. The secondary-side relief valve 50 is one example of a "second relief valve" of the present invention.

The inflow block 44 is a member for distributing hydrogen gas in the hydrogen supply passage 14 to the injectors 52. The inflow block 44 includes an inflow passage 56, a first cavity 58, a primary-side inlet port 60, a second cavity 62, a secondary-side release port 64 (a gas release part), a cavity 66, inflow holes 68, female screw holes 70, and others.

The inflow passage 56 is a passage in which hydrogen gas flows from the hydrogen supply passage 14.

The first cavity 58 is recessed in a surface 44a of the inflow block 44 facing the outflow block 46. In this first cavity 58, the primary-side relief valve 48 is accommodated. The primary-side inlet port 60 is a passage connecting to the inflow passage 56 and the first cavity 58. This allows the first cavity 58 to communicate with the inflow passage 56 through the primary-side inlet port 60 during valve opening of the primary-side relief valve 48. A bottom portion of the first cavity 58 provides a valve seat part 58a with which a valve element 82 mentioned later will be placed in contact during valve closing of the primary-side relief valve 48.

The second cavity 62 is recessed in the surface 44a of the inflow block 44. In this second cavity 62, the secondary-side relief valve 50 is accommodated. The secondary-side release port 64 is a passage communicating with the second cavity 62 and the outside of the hydrogen supply unit 24. This allows the second cavity 62 to communicate with the outside of the hydrogen supply unit 24 through the secondary-side release port 64.

The cavity 66 is recessed in the surface 44a of the inflow block 44. In this cavity 66, the injectors 52 are arranged. Each of the inlet holes 68 connects to the inflow passage 56 and the cavity 66. In each inlet hole 68, an inlet pipe 52b located on an entrance side of each corresponding injector 52 is fitted. In this way, as shown in the example of FIG. 2, the inlet pipes 52b of the three injectors 52 are arranged in parallel and connected to the inflow passage 56. The inside of the cavity 66 is a hollow and open on a far side and a near side of a drawing sheet of FIG. 2 and communicates with the outside (atmosphere) of the hydrogen supply unit 24. Further, the bolts 54 are tightened in the respective female screw holes 70.

The outflow block 46 is a member for allowing jets of hydrogen gas injected from the injectors 52 to merge with each other. The outflow block 46 includes an outflow passage 72, a primary-side release port 74 (a gas release port), a secondary-side inlet port 76, nozzle holes 78, bolt holes 80, and others.

The outflow passage 72 is a passage in which the hydrogen gas injected from the injectors 52 flows.

The primary-side release port 74 is a passage communicating with the first cavity 58 and the outside of the hydrogen supply unit 24. This allows the first cavity 58 to communicate with the outside of the hydrogen supply unit 24 through the primary-side release port 74. The secondary-side inlet port 76 is a passage connecting to the second cavity 62 and the outflow passage 72. This allows the second cavity 62 to communicate with the outflow passage 72 through the secondary-side inlet port 76 during valve opening of the secondary-side relief valve 50. Further, on a surface 46a of the outflow block 46 facing the inflow block 44, a valve seat part 46b is provided around an open area of the secondary-side inlet port 76 so that a valve element 86 mentioned later will be placed in contact with the valve seat part 46b during valve closing of the secondary-side relief valve 50.

In each of the nozzle holes 78, a nozzle pipe 52c located on an exit side of each corresponding injector 52 is fitted. In this way, as shown in the example of FIG. 2, the nozzle pipes 52c of the three injectors 52 are arranged in parallel and connected to the outflow passage 72. Further, the bolts 54 are inserted in the respective bolt holes 80.

The primary-side relief valve 48 is held between the inflow block 44 and the outflow block 46. To be concrete, the primary-side relief valve 48 includes a valve element 82, a spring 84, and others. The valve element 82 is of a cylindrical shape including a small-diameter portion 82a and a large-diameter portion 82b. The small-diameter portion 82a has a smaller diameter than the large-diameter portion 82b and is placed closer to the inflow passage 56. The valve element 82 has a flow passage 82c defined by the inside of the small-diameter portion 82a and the inside of the large-diameter portion 82b. In a part of the flow passage 82c defined by the inside of the large-diameter portion 82b, the spring 84 is placed. The valve element 82 further has communication holes 82d providing communication between the first cavity 58 and the flow passage 82c. The primary-side relief valve 48 is placed in the first cavity 58 with the spring 84 urging the valve element 82 toward the inflow passage 56.

When the internal pressure of the inflow passage 56 rises to a first predetermined value (operating pressure on the primary-side) or more, the primary-side relief valve 48 configured as above releases the hydrogen gas from inside to outside of the inflow passage 56 to reduce the internal pressure of the inflow passage 56. Concretely, when the internal pressure of the inflow passage 56 reaches the first predetermined value or more, the primary-side relief valve 48 is opened in such a manner that the valve element 82 moves against the urging force of the spring 84 to separate the small-diameter portion 82a from the valve seat part 58a of the first cavity 58. When the primary-side relief valve 48 opens in this manner, the hydrogen gas inside the inflow passage 56 is taken into the first cavity 58 through the primary-side inlet port 60. Further, the hydrogen gas is released from the primary-side relief valve 48 to the primary-side release port 74 through the communication holes 82d and the flow passage 82c of the valve element 82. Then, the hydrogen gas is discharged out of the hydrogen supply unit 24 through the primary-side release port 74. Accordingly, the internal pressure of the inflow passage 56 decreases.

The secondary-side relief valve 50 is held between the inflow block 44 and the outflow block 46. To be concrete, the secondary-side relief valve 50 includes a valve element 86, a spring 88, and others. The valve element 86 is of a cylindrical shape including a small-diameter portion 86a and a large-diameter portion 86b. The small-diameter portion 86a has a smaller diameter than the large-diameter portion 86b and is placed closer to the outflow passage 72. Further, the valve element 86 has a flow passage 86c defined by the inside of the small-diameter portion 86a and the inside of the large-diameter portion 86b. In a part of the flow passage 86c defined by the inside of the large-diameter portion 86b, the spring 88 is placed. The valve element 86 includes communication holes 86d in the small-diameter portion 86a providing communication between the second cavity 62 and the flow passage 86c. The secondary-side relief valve 50 is placed in the second cavity 62 with the spring 88 urging the valve element 86 toward the outflow passage 72.

When the internal pressure of the outflow passage 72 rises to a second predetermined value (operating pressure on the secondary-side) or more, the secondary-side relief valve 50 configured as above releases the hydrogen gas from inside to outside of the outflow passage 72 to reduce the internal pressure of the outflow passage 72. Concretely, when the internal pressure of the outflow passage 72 reaches the second predetermined value or more, the secondary-side relief valve 50 is opened in such a manner that the valve element 86 moves against the urging force of the spring 88 to separate the small-diameter portion 86a from the valve seat part 46b of the outflow block 46. When the secondary-side relief valve 50 is opened in this manner, the hydrogen gas inside the outflow passage 72 is taken into the second cavity 62 through the secondary-side inlet port 76. Further, the hydrogen gas is released from the secondary-side relief valve 50 to the secondary-side release port 64 through the communication holes 86d and the flow passage 86c of the valve element 86. Then, the hydrogen gas is discharged out of the hydrogen supply unit 24 through the secondary-side release port 64. Accordingly, the internal pressure of the outflow passage 72 decreases.

The injectors 52 adjust the flow rate and pressure of the hydrogen gas. Each of the injectors 52 includes a main part 52a, the inlet pipe 52b, and the nozzle pipe 52c. The main part 52a has a cylindrical shape. The inlet pipe 52b protrudes from one end of the main part 52a and is of a cylindrical shape having a smaller diameter than the main part 52a. The nozzle pipe 52c protrudes from the other end of the main part 52a and is of a cylindrical shape having a smaller diameter than the main part 52a. The hydrogen gas will flow in the inlet pipe 52b and be discharged from the nozzle pipe 52c. In the example shown in FIG. 2, the hydrogen supply unit 24 includes three injectors 52. However, the number of injectors 52 is not particularly limited and may be changed to one, two, or four or more.

In the hydrogen supply unit 24 configured as above, the hydrogen gas delivered into the inflow passage 56 is injected by the injectors 52 into the outflow passage 72, and thus reduced in pressure.

In this Example 1, as described above, the primary-side relief valve 48 and the secondary-side relief valve 50 are held between the inflow block 44 and the outflow block 46. Accordingly, the valve element 82 and the spring 84 of the primary-side relief valve 48 and the valve element 86 and the spring 88 of the secondary-side relief valve 50 are retained by the inflow block 44 and the outflow block 46.

This can eliminate the need for a fastening member (a tightening component) for fixing the primary-side relief valve 48 and the secondary-side relief valve 50 to the inflow block 44 and the outflow block 46, thereby enabling reduction in the number of components constituting the hydrogen supply unit 24. Further, the primary-side relief valve 48 and the secondary-side relief valve 50 can be installed in the inflow block 44 and the outflow block 46 without protruding from the inflow block 44 and the outflow block 46, so that downsizing of the hydrogen supply unit 24 can be achieved.

Furthermore, the injectors 52 are held between the inflow block 44 and the outflow block 46. This can eliminate the need for a fastening member for fixing the injectors 52 to the inflow block 44 and the outflow block 46. Thus, the number of components constituting the hydrogen supply unit 24 can be further reduced. The injectors 52 can be installed in the inflow block 44 and the outflow block 46 without protruding from the inflow block 44 and the outflow block 46, so that further downsizing of the hydrogen supply unit 24 can be achieved.

The inflow block 44 includes the first cavity 58 connected to the inflow passage 56 and the second cavity 62 connected to the outflow passage 72. The primary-side relief valve 48 is placed in the first cavity 58 with the spring 84 urging the valve element 82 toward the inflow passage 56. Further, the secondary-side relief valve 50 is placed in the second cavity 62 with the spring 88 urging the valve element 86 toward the outflow passage 72. Since the primary-side relief valve 48 and the secondary-side relief valve 50 can be placed inside the inflow block 44 in this manner, downsizing of the hydrogen supply unit 24 can be realized more effectively. In addition, two relief valves, i.e., the primary-side relief valve 48 for the inflow passage 56 and the secondary-side relief valve 50 for the outflow passage 72, can be compactly accommodated in a single unit.

Next, Examples 2 to 7 will be explained below. Similar or identical parts to those in Example 1 are assigned the same reference signs as those in Example 1 and their explanations are omitted. The following examples will be described with a focus on differences from Example 1.

Example 2

Figure 3:
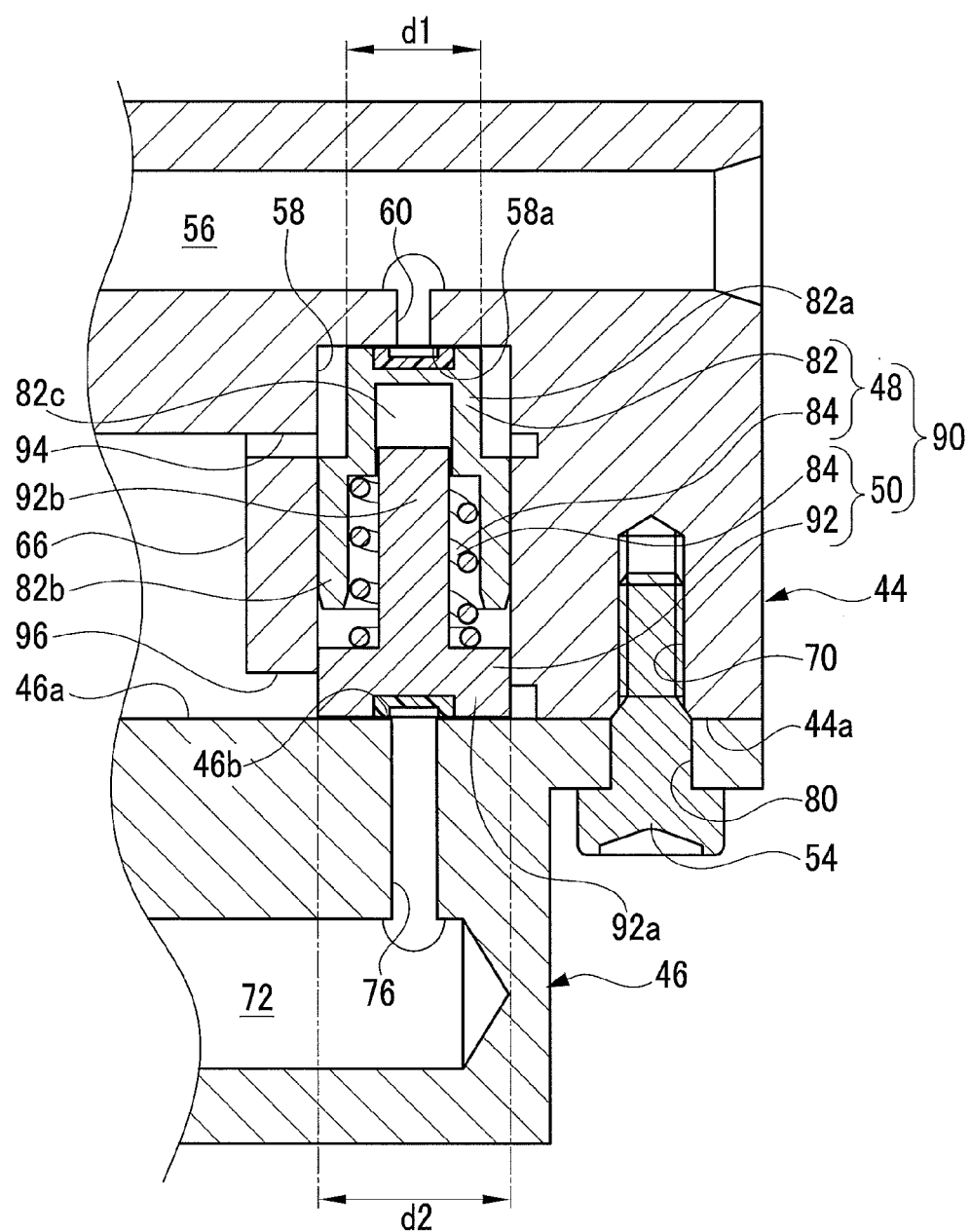
FIG. 3 is a cross sectional view of an integral relief valve and its surroundings in Example 2.

In Example 2, the hydrogen supply unit 24 includes, as shown in FIG. 3, an integral relief valve 90 formed integrally of the primary-side relief valve 48 and the secondary-side relief valve 50. This integral relief valve 90 is held between the inflow block 44 and the outflow block 46. To be concrete, the integral relief valve 90 includes the valve element 82, the spring 84, and a valve element 92. The primary-side relief valve 48 is formed of the valve element 82 and the spring 84. The secondary-side relief valve 50 is formed of the spring 84 and the valve element 92. In this example, the valve element 82 is not formed with the communication holes 82d (see FIG. 2) and thus has a simple shape. The valve element 92 has a cylindrical shape and includes a large-diameter portion 92a and a small-diameter portion 92b. The large-diameter portion 92a has a larger diameter than the small-diameter portion 92b and is placed closer to the outflow passage 72. The small-diameter portion 92b is placed inside the spring 84.

The integral relief valve 90 is placed in the first cavity 58, in which the spring 84 urges the valve element 82 toward the inflow passage 56 and the spring 84 also urges the valve element 92 toward the outflow passage 72. In this way, the integral relief valve 90 is configured so that the spring 84 is used for both the primary-side relief valve 48 and the secondary-side relief valve 50.

The valve element 92 has a sealing diameter d2 larger than a sealing diameter d1 of the valve element 82. In the integral relief valve 90, accordingly, the pressure receiving area of the valve element 92 is larger than the pressure receiving area of the valve element 82, resulting in a smaller operating pressure on the secondary-side (a second predetermined pressure) than an operating pressure on the primary-side (a first predetermined pressure). Herein, the sealing diameter d1 is an outer diameter of the small-diameter portion 82a of the valve element 82 which will contact with the valve seat part 58a. The sealing diameter d2 is an outer diameter of the large-diameter portion 92a of the valve element 92 which will contact with the valve seat part 46b. By the sealing diameter d1 and the sealing diameter d2, accordingly, the operating pressure on the primary-side and the operating pressure on the secondary-side of the integral relief valve 90 can be adjusted.

The secondary-side inlet port 76 is a passage connecting to the first cavity 58 and the outflow passage 72. Thus, the first cavity 58 will communicate with the outflow passage 72 through the secondary-side inlet port 76 during valve opening on the secondary-side of the integral relief valve 90. On the other hand, the first cavity 58 will communicate with the inflow passage 56 through the primary-side inlet port 60 during valve opening on the primary-side of the integral relief valve 90.

The inflow block 44 includes a primary-side release port 94 (a gas release part) and a secondary-side release port 96 (a gas release part). The primary-side release port 94 is a passage communicating with the first cavity 58 and the outside of the hydrogen supply unit 24. The secondary-side release port 96 is a cutout communicating with the first cavity 58 and the outside of the hydrogen supply unit 24.

When the internal pressure of the inflow passage 56 rises to the first predetermined value or more, the integral relief valve 90 configured as above will open by separating the small-diameter portion 82a of the valve element 82 from the valve seat part 58 of the first cavity 58. When the integral relief valve 90 opens on the primary-side, the hydrogen gas in the inflow passage 56 is allowed to pass through the primary-side inlet port 60, the first cavity 58, and the primary-side release port 94, to go out of the hydrogen supply unit 24 through the cavity 66. Thus, the internal pressure of the inflow passage 56 decreases.

When the internal pressure of the outflow passage 72 rises to the second predetermined value or more, the integral relief valve 90 will open by separating the large-diameter portion 92a of the valve element 92 from the valve seat part 46b of the outflow block 46. When the integral relief valve 90 opens on the secondary-side, the hydrogen gas in the outflow passage 72 is allowed to pass through the secondary-side inlet port 76, the first cavity 58, and the secondary-side release port 96, to go out of the hydrogen supply unit 24 through the cavity 66. Thus, the internal pressure of the outflow passage 72 decreases.

In this example, as described above, the primary-side relief valve 48 and the secondary-side relief valve 50 are integrally formed. This configuration allows the spring 84 to be used for both the primary-side relief valve 48 and the secondary-side relief valve 50. Therefore, it is possible to further reduce the number of components of the hydrogen supply unit 24 and also achieve downsizing of the hydrogen supply unit 24.

The secondary-side release port 96 through which the hydrogen gas can be released from the secondary-side relief valve 50 is formed of a cutout provided in the inflow block 44. Accordingly, the inflow block 44 does not need to be formed with the secondary-side release port 64 (see FIG. 2) by machining. This can reduce the number of steps of forming a flow passage in the inflow block 44, thereby achieving reduction in work load during manufacture of the hydrogen supply unit 24.

Example 3

Figure 4:
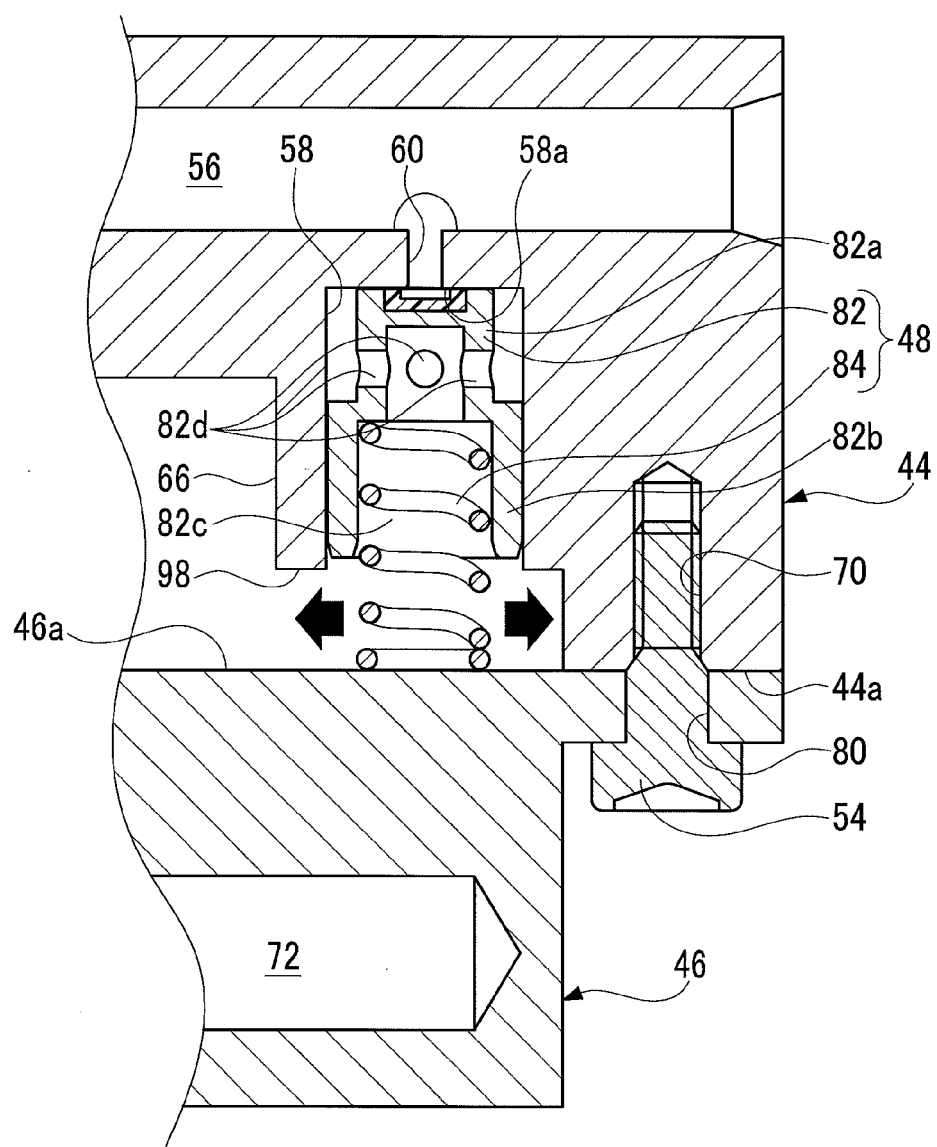
FIG. 4 is a cross sectional view of a primary-side relief valve and its surroundings in Example 3.

In Example 3, as shown in FIG. 4, the inflow block 44 includes a primary-side release port 98 (a gas release part). This primary-side release port 98 is a cutout communicating with the first cavity 58 and the outside of the hydrogen supply unit 24. Thus, the hydrogen supply unit 24 in this example is provided with the primary-side release port 98 instead of the foregoing primary-side release port 74 (see FIG. 2).

In this example, during valve opening of the primary-side relief valve 48, the hydrogen gas is allowed to pass through the primary-side release port 98 and go out of the hydrogen supply unit 24 through the cavity 66.

In this example, as described above, the primary-side release port 98, through which the hydrogen gas is released from the primary-side relief valve 48, is formed of a cutout provided in the inflow block 44. Accordingly, there is no need to form the primary-side release port 74 (see FIG. 2) in the outflow block 46 by machining. This can reduce the number of steps of forming a flow passage in the outflow block 46, thereby achieving reduction in work load during manufacture of the hydrogen supply unit 24.

Example 4

Figure 5:
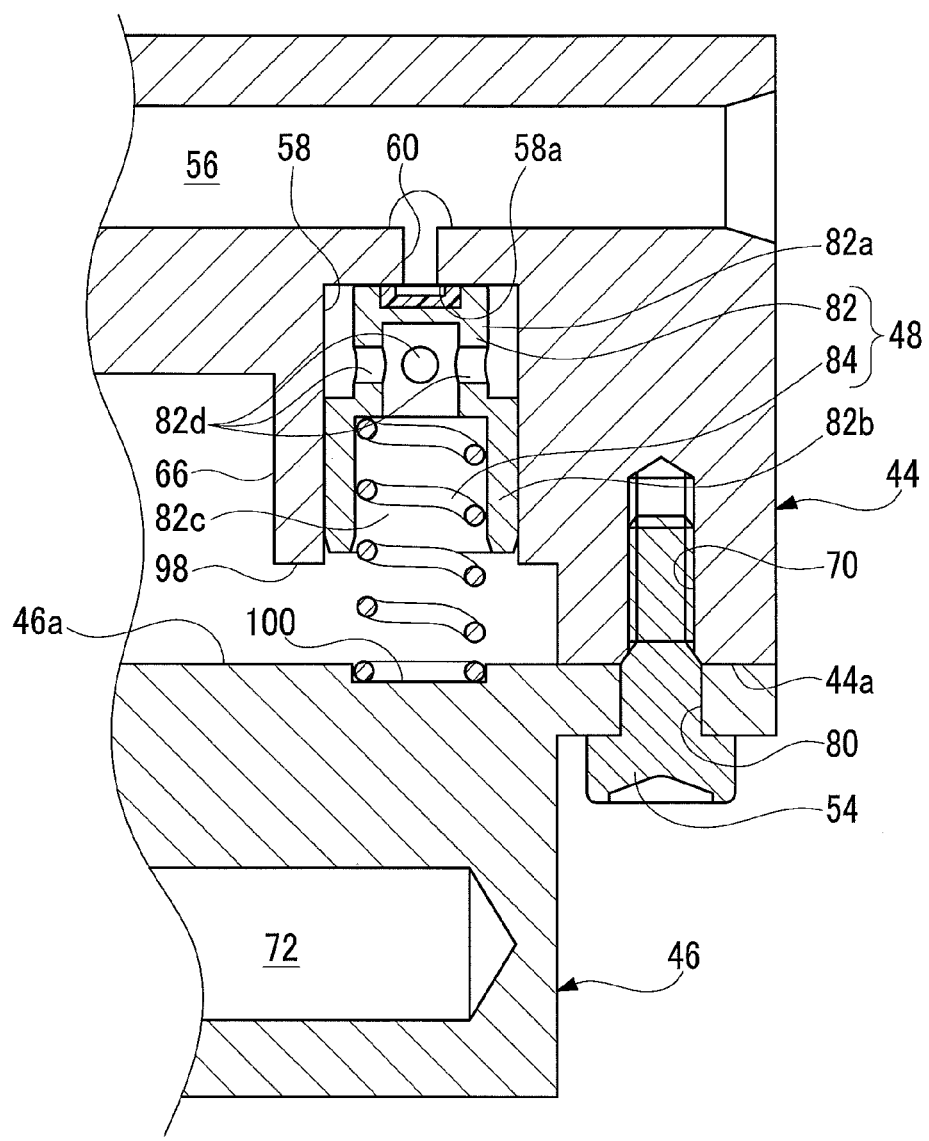
FIG. 5 is a cross sectional view of a primary-side relief valve and its surroundings in Example 4.

In Example 4, as shown in FIG. 5, the outflow block 46 includes a countersunk hole 100 in a portion (a valve seat) of the surface 46a which holds the spring 84.

In this example, as described above, the outflow block 46 is provided with the countersunk hole 100 in the portion that holds the spring 84. Accordingly, the spring 84 is held as being fitted in the countersunk hole 100. Thus, the spring 84 is less likely to be displaced and hence the primary-side relief valve 48 can operate stably. Similarly, the inflow block 44 may also be provided with a countersunk hole (not shown), as with the countersunk hole 100, in a portion of the bottom surface of the second cavity 62 that holds the spring 88 (see FIG. 2).

Example 5

Figure 6:
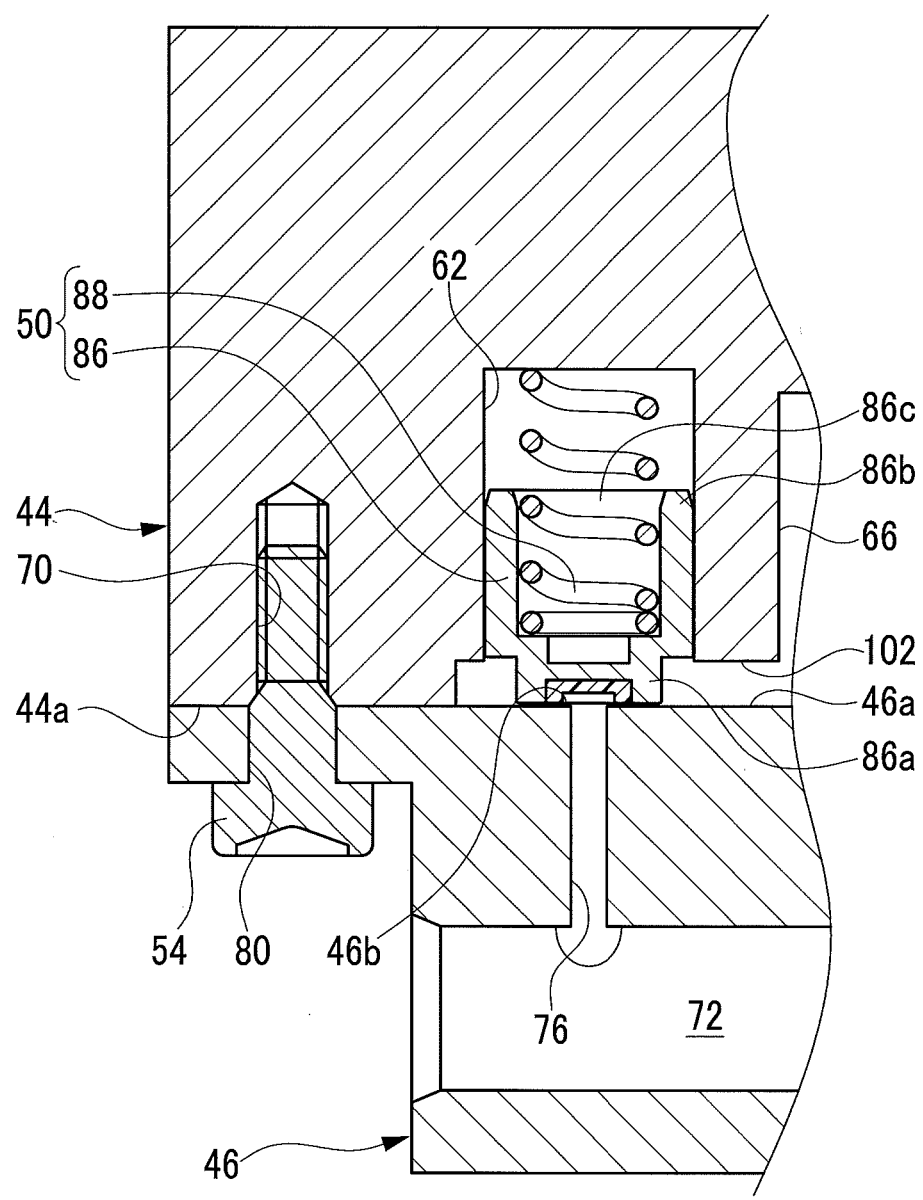
FIG. 6 is a cross sectional view of a secondary-side relief valve and its surroundings in Example 5.

In Example 5, as shown in FIG. 6, the inflow block 44 includes a secondary-side release port 102 (a gas release part). This secondary-side release port 102 is a cutout communicating with the second cavity 62 and the outside of the hydrogen supply unit 24. Specifically, the hydrogen supply unit 24 in this example is provided with the secondary-side release port 102 instead of the foregoing secondary-side release port 64 (see FIG. 2).

In this example, the valve element 86 does not include the communication holes 86d (see FIG. 2) and thus is formed with a simple structure and a reduced size.

In this example, further, during valve opening of the secondary-side relief valve 50, the hydrogen gas is allowed to pass through the secondary-side release port 102 and go out of the hydrogen supply unit 24 through the cavity 66.

In this example, as described above, the secondary-side release port 102, through which the hydrogen gas is released from the secondary-side relief valve 50, is formed of a cutout provided in the inflow block 44. Accordingly, there is no need to form the secondary-side release port 64 (see FIG. 2) in the inflow block 44 by machining. This can reduce the number of steps of forming a flow passage in the inflow block 44, thereby achieving reduction in work load during manufacture of the hydrogen supply unit 24. Further, the secondary-side relief valve 50 is simplified and reduced in size.

Example 6

Figure 7:
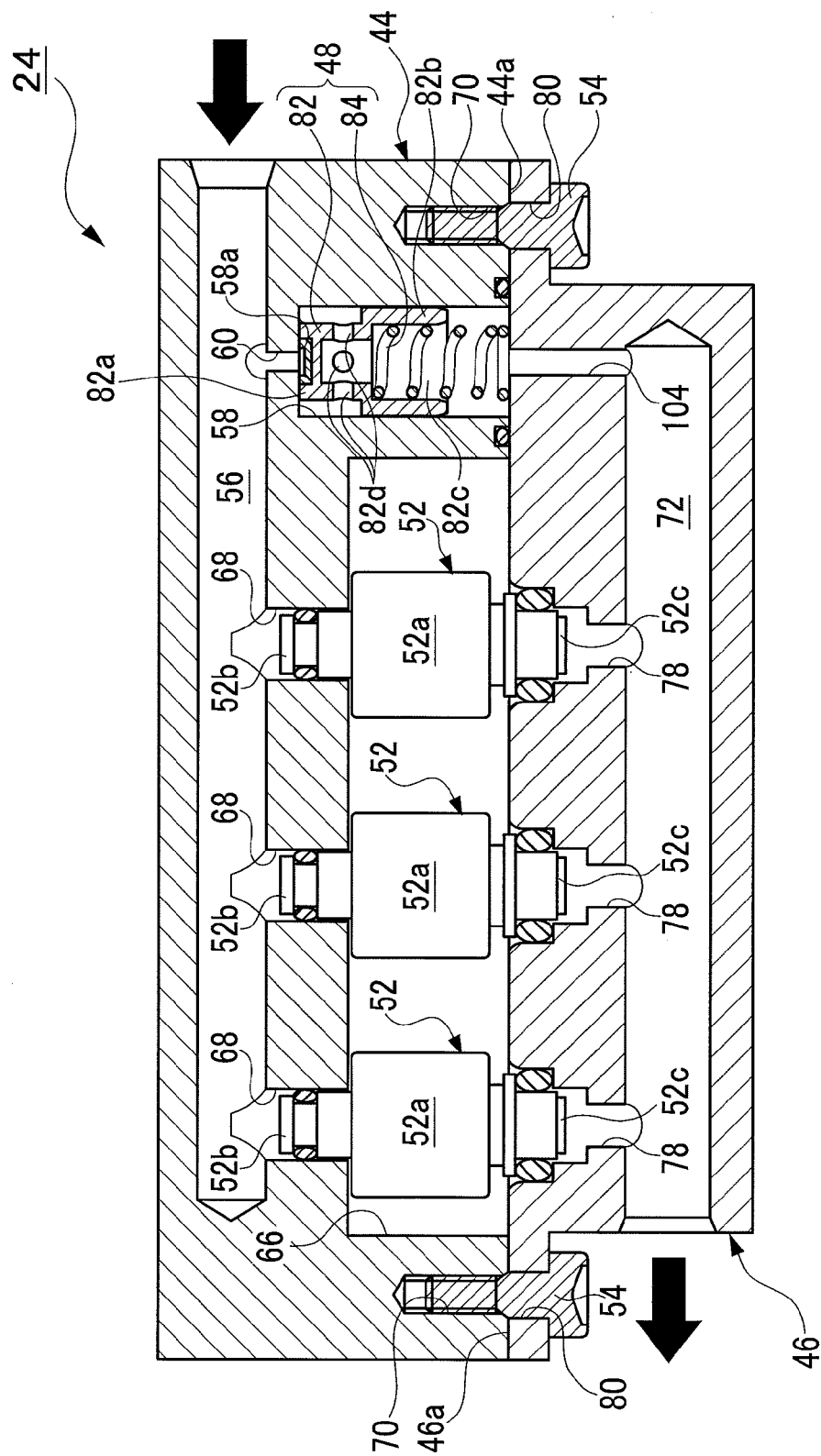
FIG. 7 is a cross sectional view of a hydrogen supply unit in Example 6.

In Example 6, as shown in FIG. 7, the outflow block 46 includes a primary-side release port 104 (a first gas release part). This primary-side release port 104 is a passage communicating with the first cavity 58 and the outflow passage 72. Specifically, the hydrogen supply unit 24 in this example is provided with the primary-side release port 104 instead of the foregoing primary-side release port 74 (see FIG. 2). Even though the secondary-side relief valve 50 is not illustrated in the example shown in FIG. 7, it may be held between the inflow block 44 and the outflow block 46 as shown in FIG. 2.

In this example, as described above, the primary-side release port 104, through which the hydrogen gas is released from the primary-side relief valve 48, communicates with the outflow passage 72. Accordingly, the hydrogen gas is allowed to be released from the primary-side relief valve 48 to the outflow passage 72 without being released to the outside of the hydrogen supply unit 24. Therefore, the flow rate of hydrogen gas to be released out of the hydrogen supply unit 24 can be reduced and thus the flow rate of hydrogen gas uselessly released can be reduced. This can also enhance safety.

Example 7

Figure 8:
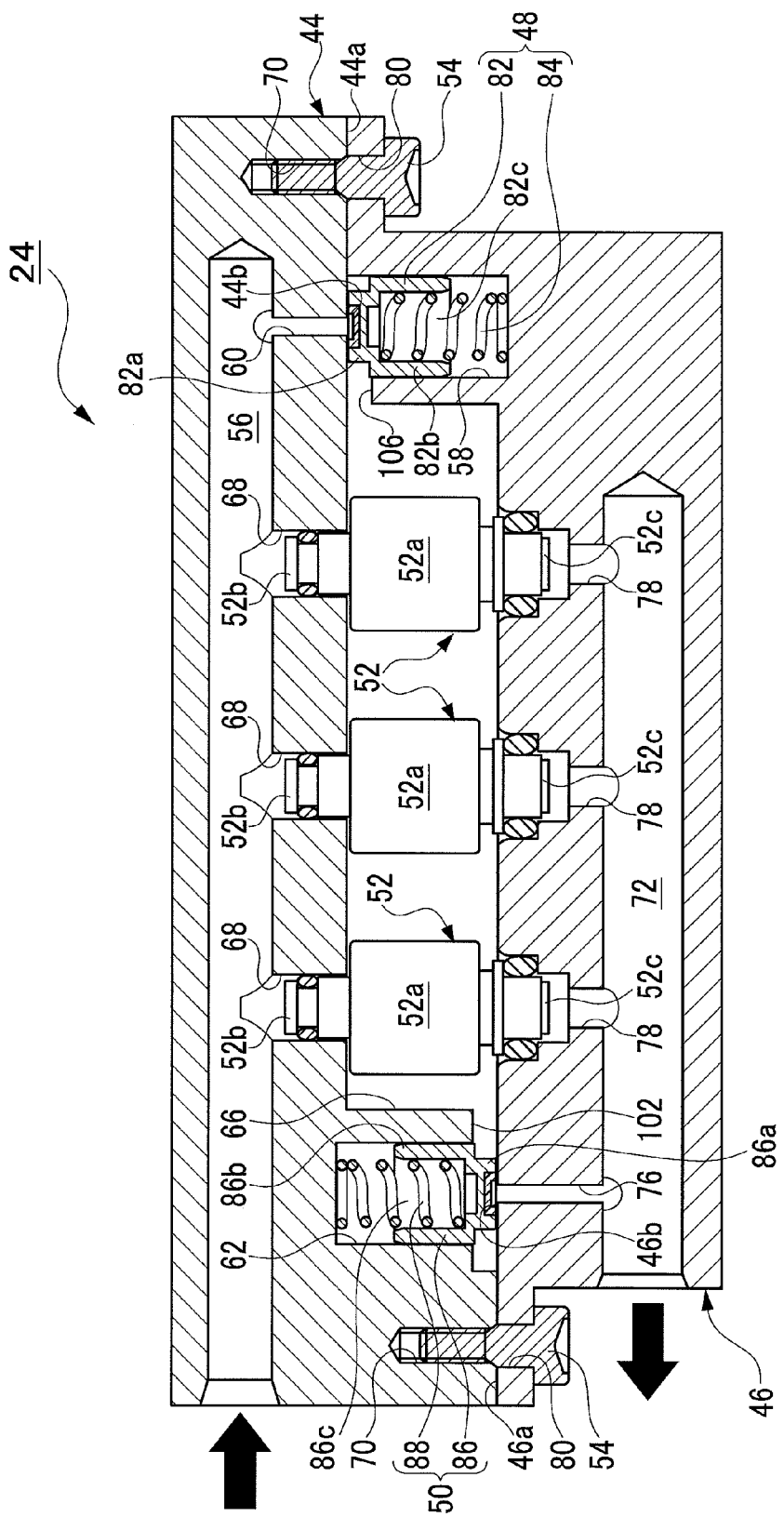
FIG. 8 is a cross sectional view of a hydrogen supply unit in Example 7.

In Example 7, as shown in FIG. 8, the inflow block 44 and the outflow block 46 each have a nearly L shape. The inflow block 44 includes the second cavity 62 which will communicate with the outflow passage 72 through the secondary-side inlet port 76. The outflow block 46 includes the first cavity 58 which will communicate with the inflow passage 56 through the primary-side inlet port 60. Further, the inflow block 44 is provided with the secondary-side release port 102. The outflow block 46 is provided with a primary-side release port 106 (a gas release part). This primary-side release port 106 is a cutout communicating with the first cavity 58 and the outside of the hydrogen supply unit 24.

The valve element 82 is not provided with the communication holes 82d (see FIG. 2) and is formed with a simple structure and a reduced size. The valve element 86 is not provided with the communication holes 86d (see FIG. 2) and also is formed with a simple structure and a reduced size. In the surface 44a of the inflow block 44, around an opening of the primary-side inlet port 60, there is provided with the valve seat part 44b with which the valve element 82 will contact during valve opening of the primary-side relief valve 48.

According to this example, the need to form or machine the secondary-side release port 64 (see FIG. 2) in the inflow block 44 can be eliminated and the need to form or machine the primary-side release port 74 (see FIG. 2) in the outflow block 46 can be eliminated. This reduces work load during manufacture of the hydrogen supply unit 24. Moreover, the primary-side relief valve 48 and the secondary-side relief valve 50 can be simplified and reduced in size.

The foregoing examples are mere exemplifications and do not particularly limit the present invention. The invention may be embodied in other specific forms without departing from the essential characteristics thereof. For instance, the second cavity 62 may be provided in the outflow block 46.

REFERENCE SIGNS LIST

1 Fuel cell system
10 Fuel cell
12 Hydrogen cylinder
14 Hydrogen supply passage
24 Hydrogen supply unit
44 Inflow block
46 Outflow block
48 Primary-side relief valve
50 Secondary-side relief valve
52 Injector
56 Inflow passage
58 First cavity
60 Primary-side inlet port
62 Second cavity
64 Secondary-side release port
72 Outflow passage
74 Primary-side release port
76 Secondary-side inlet port
82 Valve element
84 Spring
86 Valve element
88 Spring
90 Integral relief valve
92 Valve element
94 Primary-side release port
96 Secondary-side release port
98 Primary-side release port
100 Countersunk hole
102 Secondary-side release port
104 Primary-side release port
106 Primary-side release port
d1 Sealing diameter
d2 Sealing diameter

What is claimed is:

1. A fuel supply unit comprising:
an inflow block provided with an inflow passage in which fuel gas will flow;
an outflow block provided with an outflow passage from which the fuel gas will flow out; and
at least one injector for adjusting flow rate and pressure of the fuel gas,
the injector being configured to inject the fuel gas having flowed in the inflow passage into the outflow passage to reduce pressure of the fuel gas,
wherein the fuel supply unit further comprises a relief valve configured to release the fuel gas from inside to outside of either the inflow passage or the outflow passage when internal pressure of the corresponding passage rises a predetermined value or more, and
the relief valve is held between the inflow block and the outflow block.

2. The fuel supply unit according to claim 1, wherein:
at least one of the inflow block and the outflow block is provided with a cavity connected to the corresponding passage, and
the relief valve includes a valve element and a spring and is placed in the cavity with the spring urging the valve element toward the corresponding passage.

3. The fuel supply unit according to claim 2, wherein at least one of the inflow block and the outflow block has a portion provided with a countersunk hole to hold the spring.

4. The fuel supply unit according to claim 1, wherein the relief valve includes a first relief valve configured to release the fuel gas from inside to outside of the inflow passage, and a second relief valve configured to release the fuel gas from inside to outside of the outflow passage.

5. The fuel supply unit according to claim 4, wherein the first relief valve and the second relief valve are integrally formed.

6. The fuel supply unit according to claim 4, further including a first gas release part through which the fuel gas will be released from the first relief valve communicates with the outflow passage.

7. The fuel supply unit according to claim 1 further including a gas release part through which the fuel gas will be released from the relief valve, the gas release part being a cutout provided in either one of the inflow block and the outflow block.

\* \* \* \* \*